(12) United States Patent
Marshall

(10) Patent No.: US 8,104,262 B2
(45) Date of Patent: Jan. 31, 2012

(54) DUAL FUNCTION CASCADE INTEGRATED VARIABLE AREA FAN NOZZLE AND THRUST REVERSER

(75) Inventor: Richard M. Marshall, West Granby, CT (US)

(73) Assignee: United Technologies Corporation, Hartford, CT (US)

( * ) Notice: Subject to any disclaimer, the term of this patent is extended or adjusted under 35 U.S.C. 154(b) by 309 days.

(21) Appl. No.: 12/440,746

(22) PCT Filed: Oct. 12, 2006

(86) PCT No.: PCT/US2006/039990
§ 371 (c)(1),
(2), (4) Date: Mar. 11, 2009

(87) PCT Pub. No.: WO2008/045072
PCT Pub. Date: Apr. 17, 2008

(65) Prior Publication Data
US 2010/0005777 A1    Jan. 14, 2010

(51) Int. Cl.
*F02K 3/02* (2006.01)
(52) U.S. Cl. ... 60/226.2; 60/226.3; 60/230; 239/265.19; 239/265.33; 239/265.31

(58) Field of Classification Search ............... 60/226.2, 60/226.3, 230; 239/265.19, 265.33, 265.31
See application file for complete search history.

(56) References Cited

U.S. PATENT DOCUMENTS

| 3,779,010 A | 12/1973 | Chamay et al. |
| 5,655,360 A | 8/1997 | Butler |

OTHER PUBLICATIONS

Search Report and Written Opinion mailed on Jun. 22, 2007 for PCT/US2006/039990.
Notification of Transmittal of The International Preliminary Report on Patentability mailed on Dec. 12, 2008 for PCT/US2006/039990.
International Preliminary Report on Patentability dated Mar. 2, 2009.

*Primary Examiner* — Ehud Gartenberg
*Assistant Examiner* — Craig Kim
(74) *Attorney, Agent, or Firm* — Carlson, Gaskey & Olds, P.C.

(57) ABSTRACT

A gas turbine engine system includes a nozzle having a plurality of positions for altering a discharge flow received through the nozzle from a gas turbine engine fan bypass passage. The nozzle is integrated with a thrust reverser having a stowed position and a deployed position to divert the discharge flow and generate a reverse thrust force. At least one actuator is coupled with the nozzle and the thrust reverser to selectively move the nozzle between the plurality of positions and to move the thrust reverser between the stowed position and the deployed position.

22 Claims, 4 Drawing Sheets

DUAL FUNCTION CASCADE INTEGRATED VARIABLE AREA FAN NOZZLE AND THRUST REVERSER

BACKGROUND OF THE INVENTION

This invention relates to gas turbine engines and, more particularly, to a gas turbine engine having a variable fan nozzle integrated with a thrust reverser of the gas turbine engine.

Gas turbine engines are widely known and used for power generation and vehicle (e.g., aircraft) propulsion. A typical gas turbine engine includes a compression section, a combustion section, and a turbine section that utilize a primary airflow into the engine to generate power or propel the vehicle. The gas turbine engine is typically mounted within a housing, such as a nacelle. A bypass airflow flows through a passage between the housing and the, engine and exits from the engine at an outlet.

Presently, conventional thrust reversers are used to generate a reverse thrust force to slow forward movement of a vehicle, such as an aircraft. One type of conventional thrust reverser utilizes a moveable door stowed near the rear of the nacelle. After touch-down of the aircraft for landing, the door moves into the bypass airflow passage to deflect the bypass airflow radially outwards into cascades, or vents, that direct the discharge airflow in a forward direction to slow the aircraft. Although effective, this and other conventional thrust reversers serve only for thrust reversal and, when in the stowed position for non-landing conditions, do not provide additional functionality. The use of a variable area fan nozzle (VAFN) has been proposed for low pressure ratio fan designs to improve the propulsive efficiency of high bypass ratio gas turbine engines. Integrating the VAFN functionality into a common set of thrust reverser cascades operated by a common actuation system represents a significant reduction in complexity and weight.

SUMMARY OF THE INVENTION

An example gas turbine engine system includes a mechanism that integrates the functions of a variable fan nozzle and a thrust reverser. The nozzle includes a plurality of positions for altering a discharge flow received through the nozzle from a gas turbine engine fan bypass passage. The nozzle is integrated with a thrust reverser having a stowed position and a deployed position to divert the discharge flow and generate a reverse thrust force. A single actuator or single set of actuators is coupled with the nozzle and the thrust reverser to selectively move the nozzle between the plurality of positions and to move the thrust reverser between the stowed position and the deployed position. This integrates the functions of the nozzle and the thrust reverser while eliminating the need for separate actuators or sets of actuators for the nozzle and the thrust reverser.

An example method of controlling the gas turbine engine system includes the steps of activating the actuator or actuators to move the nozzle between the plurality of positions to establish a desired discharge flow through the nozzle, and activating the actuator or actuators to move the thrust reverser between the stowed position and the deployed position.

BRIEF DESCRIPTION OF THE DRAWINGS

The various features and advantages of this invention will become apparent to those skilled in the art from the following detailed description of the currently preferred embodiment.

The drawings that accompany the detailed description can be briefly described as follows.

DETAILED DESCRIPTION OF THE PREFERRED EMBODIMENT

Figure 1:
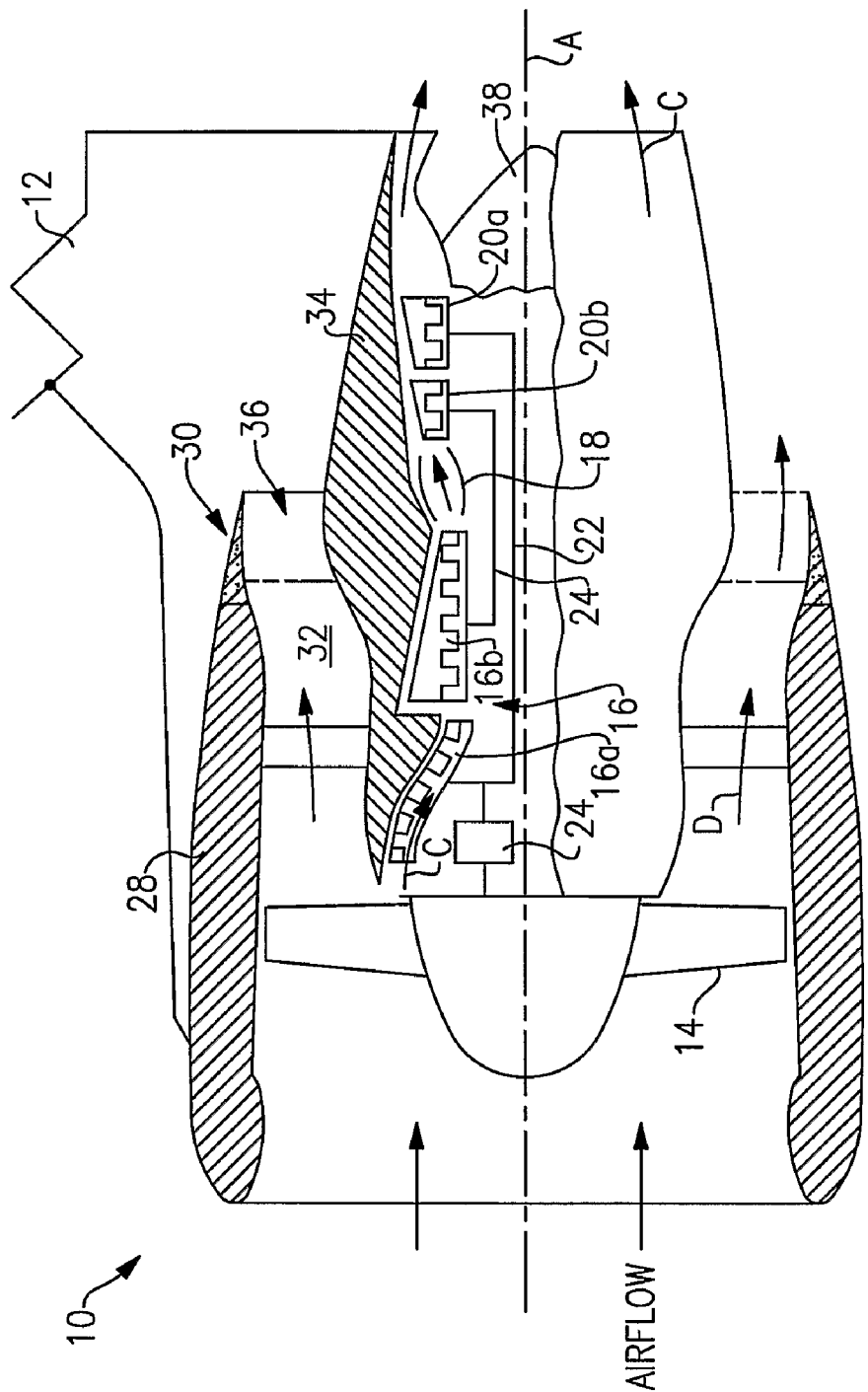
FIG. 1 illustrates selected portions of an example gas turbine engine system having a mechanism that integrates a variable fan nozzle integrated and a thrust reverser.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22 and 24 (e.g., spools) to rotationally drive the compressors 16a, 16b and the fan 14 in response to the expansion. In this example, the rotor 22 also drives the fan 14 through a gear train 24.

In the example shown, the gas turbine engine 10 is a high bypass turbofan arrangement. In one example, the bypass ratio is greater than 10, and the fan 14 diameter is substantially larger than the diameter of the low pressure compressor 16a. The low pressure turbine 20a has a pressure ratio that is greater than 5, in one example. The gear train 24 is an epicycle gear train, for example, a star gear train, providing a gear reduction ratio of greater than 2.5. It should be understood, however, that the above parameters are only exemplary of a contemplated geared turbofan engine. That is, the invention is applicable to other engines.

An outer housing, nacelle 28, (also commonly referred to as a fan nacelle) extends circumferentially about the fan 14. A fan bypass passage 32 extends between the nacelle 28 and an inner housing, inner cowl 34, which generally surrounds the compressors 16a, 16b and turbines 20a, 20b. In this example, the gas turbine engine 10 includes integrated mechanisms 30 that are coupled to the nacelle 28. The integrated mechanisms 30 integrate functions of a variable fan nozzle and a thrust reverser, as will be described below. Any number of integrated mechanisms 30 may be used to meet the particular needs of an engine. In this example, two integrated mechanisms 30 are used, one on each semi-circular half of the nacelle 28.

In operation, the fan 14 draws air into the gas turbine engine 10 as a core flow, C, and into the bypass passage 32 as a bypass air flow, D. The bypass air flow D is discharged as a discharge flow through a rear exhaust 36 associated with the integrated mechanism 30 near the rear of the nacelle 28 in this example. The core flow C is discharged from a passage between the inner cowl 34 and a tail cone 38.

For the gas turbine engine 10 shown FIG. 1, a significant amount of thrust may be provided by the discharge flow due to the high bypass ratio. Thrust is a function of density, velocity, and area. One or more of these parameters can be manipulated to vary the amount and direction of thrust provided or to enhance conditions for aircraft control, operation of the fan 14, operation of other components associated with the bypass passage 32, or operation of the gas turbine engine 10. For example, an effective reduction in area of the rear exhaust 36 causes an air pressure increase within the bypass passage 32 that in turn changes a pressure ratio across the fan 14.

In the disclosed example, the integrated mechanism 30 includes a structure associated with the rear exhaust 36 to change one or more of these parameters. However, it should be understood that the bypass flow or discharge flow may be effectively altered by other than structural changes, for example, by altering a flow boundary layer. Furthermore, it should be understood that effectively altering a cross-sectional area of the rear exhaust 36 is not limited to physical locations approximate to the exit of the nacelle 28, but rather, includes altering the bypass flow D by any suitable means.

Figure 2:
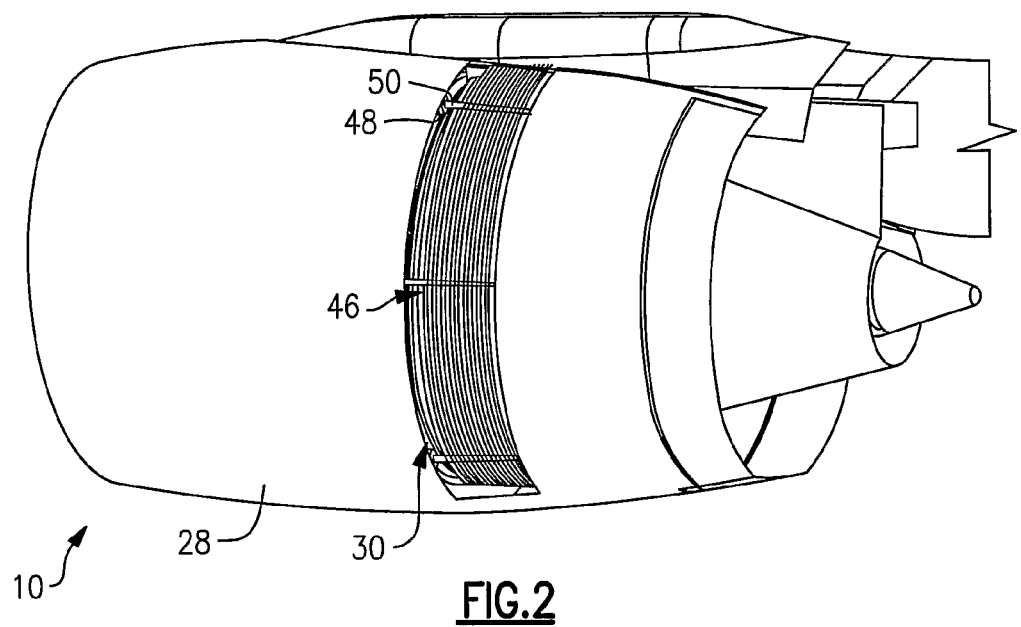
FIG. 2 illustrates a perspective view of the example gas turbine engine system with cascades exposed for thrust reversal.
Figure 3A:
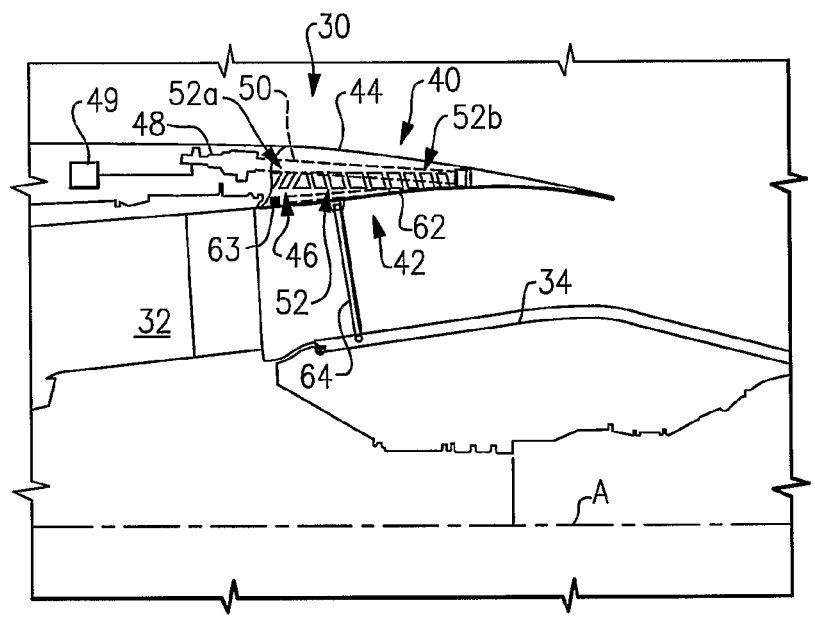
FIG. 3A illustrates a schematic view of the mechanism having an axially moveable section that is in a closed position.

Referring to FIGS. 2 and 3A, the integrated mechanism 30 in this example includes a nozzle 40 and a thrust reverser 42. The nozzle 40 and thrust reverser include a common part, section 44, which is moveable between a plurality of axial positions relative to the centerline axis A. In this example, the section 44 is a hollow sleeve-like structure that extends about a cascade section 46. Actuators 48 are mounted within the nacelle 28 in this example. Links 50 extend through the cascade section 46 and are coupled on one end with the respective actuators 48 and on an opposite end with the section 44 in a known manner. A controller 49 communicates with the actuators 48 to selectively axially move the section 44. The controller 49 may be dedicated to controlling the integrated mechanism 30, integrated into an existing engine controller within the gas turbine engine 10, or be incorporated with other known aircraft or engine controls. Alternatively, one or more of the actuators 48 are mounted within the cascade section 46 in a known manner.

In the disclosed example, the cascade section 46 includes a plurality of apertures 52, or vents, that provide a flow path between the bypass passage 32 and the exterior environment of the gas turbine engine 10. The apertures 52 may be formed in any known suitable shape, such as with airfoil shaped vanes between the apertures. In this example, the apertures 52 are arranged in circumferential rows about the cascade section 46. A first set of apertures 52a near the forward end of the cascade section 46 are angled aft and a second set of apertures 52b aft of the first set of apertures 52a are angled forward. Axial movement of the section 44 selectively opens, or exposes, the apertures 52a, apertures 52b, or both to provide an auxiliary passage for the discharge flow, as will be described below.

In the illustrated example, there are two circumferential rows in the first set of apertures 52a and a larger number of circumferential rows in the second set of apertures 52b. In one example, two circumferential rows in the first set of apertures 52a is adequate for altering the discharge flow, as will be described. However, it is to be understood that one circumferential row or greater than two circumferential rows may be used for smaller or larger alterations, respectively.

Figure 3B:
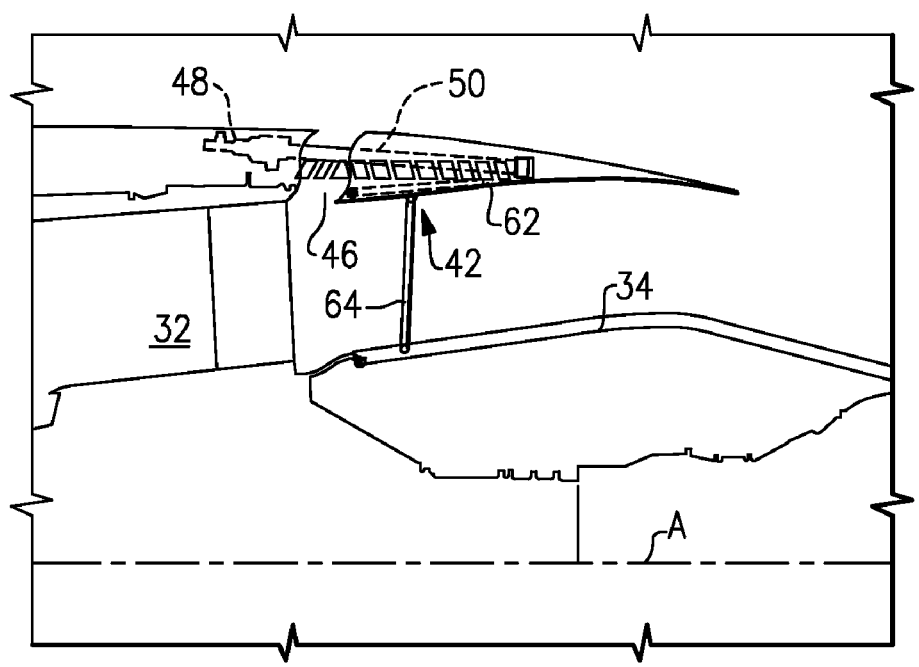
FIG. 3B illustrates a schematic view of the axially moveable section in an intermediate position for altering a discharge flow from the gas turbine engine.
Figure 3C:
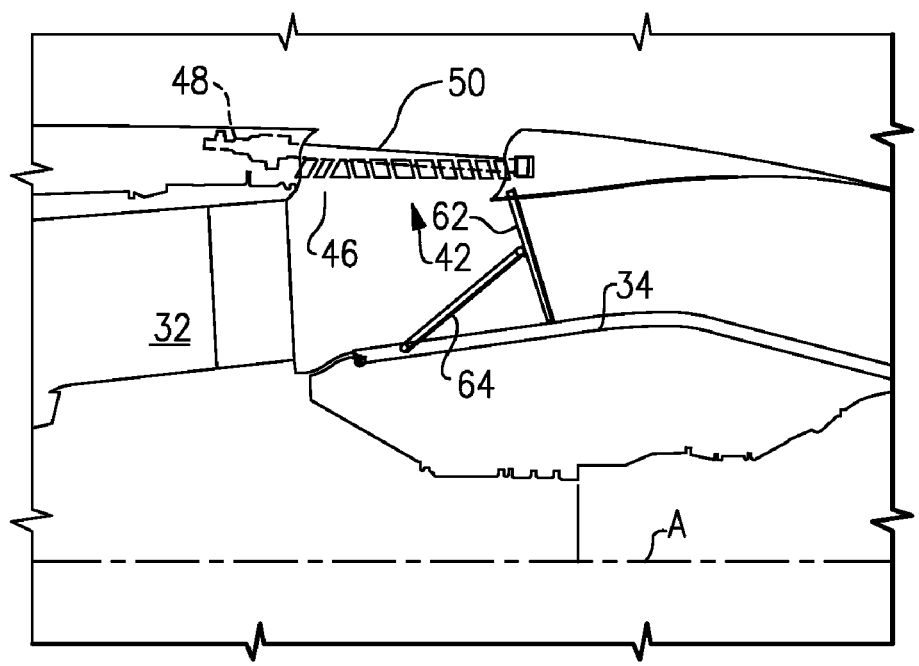
FIG. 3C illustrates a schematic view of the axially moveable section in an open position for generating a thrust reversing force.

The thrust reverser 42 includes a blocker door 62 having a stowed position (FIG. 3A) and a fully deployed position (FIG. 3C). The blocker door 62 is pivotally connected to the section 44 at connection 63. A drag link 64 includes one end that is slidably connected to the blocker door 62 and an opposite end that is connected to a support, the inner cowl 34 in this example. Although only one drag link 64 is shown, it is to be understood that any suitable number of drag links 64 may be used.

Figure 4:
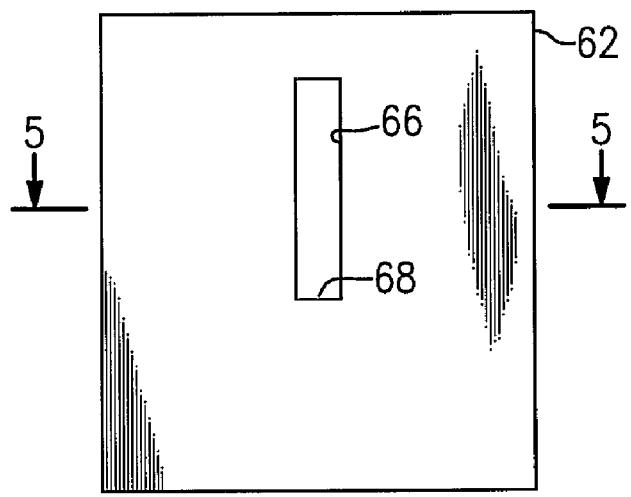
FIG. 4 illustrates a blocker door of the thrust reverser.
Figure 5:
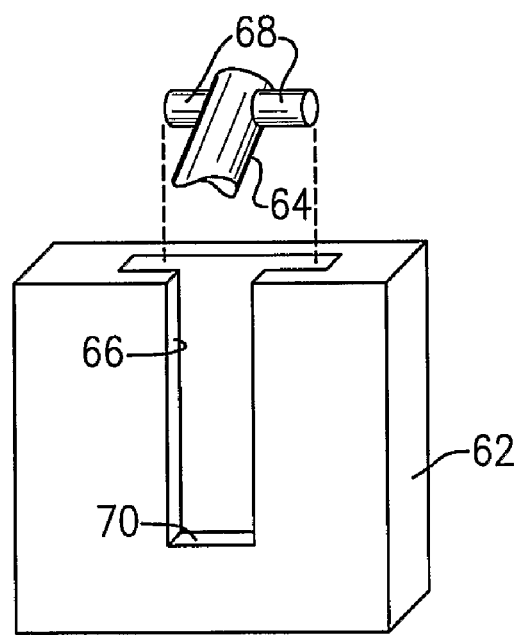
FIG. 5 illustrates a view of an example slot of the blocker door according to the section shown in FIG. 4.

Referring to FIGS. 4 and 5, the blocker door 62 includes a slot 66 for slidably connecting the drag link 64 to the blocker door 62. In this example, the shape of the slot 66 is adapted to receive and retain the end of the drag link 64. For example, the slot 66 is T-shaped and the end of drag link 64 includes laterally extending slide members 68, such as rollers, bearings, friction material, or other known suitable mechanism for allowing the end of the drag link 64 to slide along the slot 66. Given this description, one of ordinary skill in the art will recognize alternative suitable slot shapes or sliding connections to meet their particular needs.

In operation, the controller 49 selectively commands the actuators 48 to move the section 44 between the plurality of axial positions to alter the discharge flow or provide thrust reversal. FIG. 3A illustrates the section 44 in a first axial position (i.e., a closed position) sealed against the nacelle 28. In the closed position, the section 44 completely covers the cascade section 46 such that the discharge flow exits axially through the rear exhaust 36.

FIG. 3B illustrates the section 44 in a second axial position spaced apart from the nacelle 28 to provide an opening there between and expose a portion of the cascade section 46. In the second position, the first set of apertures 52a are exposed to provide an auxiliary passage for the discharge flow. The auxiliary passage provides an additional passage (i.e., additional effective cross-sectional flow area) for exit of the discharge flow from the bypass passage 32 to thereby alter the discharge flow. A portion of the discharge flow flows through the first set of apertures 52a and is directed in the aft direction. Although the aft angle in the illustrated example is not parallel to the centerline axis A, a geometric component of the aft angle is parallel. The geometric component of the discharge flow that is parallel to the centerline axis A provides the benefit of maintaining a portion of the thrust generated by the discharge flow.

Upon movement of the section 44 between the first position and the second position, the blocker door 62 remains in the stowed position. The connection between the drag link 64 and the slot 66 provides a range of lost motion movement. That is, the movement of the section 44 causes the drag link 64 to slide along the slot 66 of the blocker door 62 without moving the blocker door 62 into the deployed position.

FIG. 3C illustrates the section 44 in a third axial position (i.e., a thrust reverse position). Movement of the section 44 beyond the second position toward the third position causes the end of the drag link 64 to engage an end 70 of the slot 66. Once engaged, the drag link 64 pivots the blocker door 62 about the connection 63 and into the bypass passage 32. The blocker door 62 deflects the discharge flow radially outwards relative to the centerline axis A toward the cascade section 46. The movement of the section 44 to the third position also exposes the apertures 52b. The deflected discharge flow enters the second set of apertures 52b, which angle the discharge flow in the forward direction to generate a reverse thrust force.

In this example, there are more apertures 52 within the first set of apertures 52b than in the second set of apertures 52a. Thus, the reverse thrust force due to discharge flow through the second set of apertures 52b overcomes any thrust due to aft discharge flow from the apertures 52a.

The disclosed example integrated mechanism 30 thereby integrates the function of altering the discharge flow with the thrust reversing function. The integrated mechanism 30 utilizes a single set or system of actuators 48 to eliminate the need for separate actuators or sets of actuators for altering the discharge flow and deploying the thrust reverser. Using a single actuator or set of actuators 48 as in the disclosed examples eliminates at least some of the actuators that would otherwise be used, thereby reducing the weight of the gas turbine engine 10 and increasing the fuel efficiency.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine system, comprising:
   a nozzle having a plurality of positions to control a discharge flow received from a gas turbine engine fan bypass passage disposed along an axis;
   a thrust reverser having a blocker door moveable between a stowed position and a deployed position to divert the discharge flow in a thrust reversing direction, the blocker door including a slot having a T-shaped cross section along the axis when in a stowed position and a corresponding link;
   the link having one end slidably connected with the slot of the blocker door and an opposite end connected to a support; and
   at least one actuator coupled with the nozzle and the thrust reverser, the at least one actuator selectively operative to move the nozzle between the plurality of positions and to move the thrust reverser between the stowed position and the deployed position.

2. The gas turbine engine system as recited in claim 1, further comprising a section that is common to the nozzle and the thrust reverser, wherein the section is coupled with the at least one actuator and is translatable between axial positions corresponding to the plurality of positions of the nozzle, the stowed position, and the deployed position.

3. The gas turbine engine system as recited in claim 2, wherein the thrust reverser includes a blocker door pivotally coupled with the section such that translation of the section between at least a portion of the axial positions moves the blocker door between the stowed position and the deployed position.

4. The gas turbine engine system as recited in claim 3, wherein the blocker door includes a lost motion connection such that the blocker door remains in the stowed position responsive to translation of the section between the axial positions that correspond to the plurality of positions.

5. The gas turbine engine system as recited in claim 4, further comprising a cascade section having apertures that are spaced apart, wherein a first set of the apertures directs the discharge flow in a first direction, and a second set of the apertures directs the discharge flow in a second direction that is transverse to the first direction.

6. The gas turbine engine system as recited in claim 5, wherein the first direction correspond to a forward direction relative to the discharge flow through the gas turbine engine fan bypass passage, and the second direction corresponds to an aft direction.

7. The gas turbine engine system as recited in claim 1, further comprising a cascade section having apertures that are spaced apart.

8. The gas turbine engine system as recited in claim 7, wherein a first set of the apertures directs the discharge flow in a first direction, and a second set of the apertures directs the discharge flow in a second direction.

9. The gas turbine engine system as recited in claim 8, wherein the nozzle comprises a section that is moveable between the plurality of positions, the section blocking the discharge flow from entering the apertures in a first one of the plurality of positions, permitting the discharge flow into the first set of apertures in a second one of the plurality of positions, and blocking the discharge flow from entering the second set of apertures in the second one of the plurality of positions.

10. The gas turbine engine system as recited in claim 9, wherein the section permits the discharge flow into the first set and the second set of apertures in a third one of the plurality of positions.

11. The gas turbine engine system as recited in claim 1, wherein the end of the link includes laterally extending slide members.

12. The gas turbine engine system as recited in claim 11, wherein the laterally extending slide members comprise at least one of rollers or bearings.

13. The gas turbine engine system as recited in claim 11, wherein the laterally extending slide members comprise a friction material.

14. The gas turbine engine system as recited in claim 1, further comprising
   a fan;
   a nacelle arranged about the fan; and
   a gas turbine engine core having a compressor and a turbine at least partially within the nacelle, wherein the gas turbine engine fan bypass passage extends between the nacelle and the gas turbine engine core.

15. A method of controlling a gas turbine engine system including a thrust reverser having a stowed position and a deployed position for slowing a vehicle and a nozzle along an axis that is moveable to control a discharge flow from a gas turbine engine, the method comprising:
   (a) coupling the nozzle and the thrust reverser with at least one actuator;
   (b) activating the at least one actuator to move the nozzle between a plurality of positions to establish a desired discharge flow through the nozzle;
   (c) activating the at least one actuator to move the thrust reverser between the stowed position and the deployed position to divert the discharge flow in a thrust reversing direction by sliding one end of a link within a slot of a blocker door of the thrust reverser, the slot having a T-shaped cross section along the axis when in the stowed position.

16. The method as recited in claim 15, wherein said step (c) further includes moving the thrust reverser through a range of lost motion responsive to moving the nozzle between the plurality of positions.

17. The gas turbine engine system as recited in claim 1, further comprising a cascade section having apertures arranged in circumferential rows.

18. The gas turbine engine system as recited in claim 1, wherein the support is an inner cowl.

19. The gas turbine engine system as recited in claim 4, wherein the link slides within the slot.

20. The gas turbine engine system as recited in claim 5, wherein a flow path through the first set of apertures is different than a flow path through the second set of apertures.

21. The gas turbine engine system as recited in claim 8, wherein a number of apertures in the first set of apertures is greater than a number of apertures in the second set of apertures.

22. The method as recited in claim 15, wherein in step (c) the blocker door remains stationary while the end of the link slides within the slot with the T-shaped cross section.

* * * * *